United States Patent
Chohan et al.

(10) Patent No.: US 6,753,891 B1
(45) Date of Patent: Jun. 22, 2004

(54) AIRCRAFT ELECTRONIC CHECKLIST SYSTEM WITH HYPERLINKS

(75) Inventors: Muhammad M. Chohan, Glendale, AZ (US); Carlos M. Gameros, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 417 days.

(21) Appl. No.: 09/695,322

(22) Filed: Oct. 25, 2000

(51) Int. Cl.[7] ................................................ G09G 5/00
(52) U.S. Cl. ...................................... 345/790; 701/200
(58) Field of Search ................................. 345/788–801; 73/178 R; 701/1, 14, 200–204, 208, 221, 120; 340/449, 974, 971; 244/1 R, 175, 186; 342/33, 36–40

(56) References Cited

U.S. PATENT DOCUMENTS

| | | | |
|---|---|---|---|
| 5,444,837 A | | 8/1995 | Bomans et al. |
| 5,454,074 A | | 9/1995 | Hartel et al. |
| 5,519,392 A | * | 5/1996 | Oder et al. .................. 340/995 |
| 5,815,407 A | * | 9/1998 | Huffman et al. ............... 702/57 |
| 6,112,141 A | * | 8/2000 | Briffe et al. ................... 701/14 |
| 6,148,261 A | * | 11/2000 | Obradovich et al. ......... 701/208 |
| 6,330,497 B1 | * | 12/2001 | Obradovich et al. ............ 701/1 |

* cited by examiner

*Primary Examiner*—Kristine Kincaid
*Assistant Examiner*—Lê Nguyen

(57) ABSTRACT

An aircraft electronic checklist system including (a) an aircraft electronic checklist display unit for displaying on a display an aircraft checklist comprising one or more checklist line items; and (b) a hyperlinked information display unit for displaying information linked by a hyperlink of a checklist line item in response to activation of the hyperlink.

49 Claims, 10 Drawing Sheets

AIRCRAFT ELECTRONIC CHECKLIST SYSTEM WITH HYPERLINKS

BACKGROUND OF THE INVENTION

1. Field of the Invention

The present invention relates to an electronic checklist system for use in a vehicle, preferably an aircraft.

2. Related Art

During flight operation, pilots follow standard procedures to check aircraft operational status and to control aircraft operations. Such procedures are combined together in the form of a checklist. A checklist is simply a collection of line items that defines the procedure for the pilot to verify the aircraft status and to manage aircraft systems for safe operation.

Paper checklists were used in the past, but today electronic checklist systems have been developed that can augment or replace paper checklists. These systems reduce flight crew workload by visually providing information required during execution of checklist procedures. These systems display checklists on a display in the cockpit, such as a CRT or an LCD.

Typically, checklists are organized so as to logically follow pre-designed (i.e., predetermined) flight procedures. There are two main types of checklists, "normal" checklists and "abnormal" checklists. For example, "normal" checklists generally track the flow of events in preparing the aircraft for flight, flying, and then shutting down after a flight. Thus, normal checklists typically include "Before Engine Start", "Starting Engines", "After Start", "Taxi", "Line Up", and "Climb" checklists, for example. On the other hand, "abnormal" checklists are usually grouped by the major aircraft subsystems, and thus typically include, for example, "Fuel", "Hydraulics", and "Engine" checklists, etc.

Each checklist includes one or more checklist line item. A checklist line item typically defines a single step or task to be carried out by the user (e.g., the pilot). Generally speaking, there are two main types of checklist line items. The first main type is a step or task requiring verification of aircraft status. In other words, aircraft status information must be retrieved and monitored to determine if a condition has been satisfied. Examples include checking the altitude, the differential pressure, the cabin temperature, etc., typically comparing the checked values against predetermined standards (e.g., checking to see if the altitude is below 5000 feet).

The second main type of checklist line item is a step or task requiring management of aircraft systems for safe operation (i.e., to perform aircraft control operations). Examples include lowering the landing gear, turning on the cabin lights, closing a valve, shutting off an engine, pressurizing the cabin, etc. Typically, the user moves from checklist line item to checklist line item (and from checklist to checklist) using a cursor control device (CCD) such as a trackball to direct the cursor. After the user performs the task for a checklist line item, the user "checks off" the item to indicate its completion or satisfaction. To do so, the user typically manually inputs to direct the check off (e.g., the user presses an enter button on the CCD). Alternatively, the electronic checklist system may automatically check off a checklist item in accordance with automatic detection of aircraft status information (e.g., the system detects actuation of a switch that controls the landing gear, and in response to the detection automatically checks off a checklist item). Checklist line items using the former approach are referred to as "open loop" items because they require manual input from the pilot to check off the item, while items using the latter approach are referred to as "closed loop" items because the condition precedent to the check off is automatically sensed.

As discussed above, checklists (both paper and electronic) require the user to refer to aircraft status information and/or to perform aircraft control operations, as discussed above. Providing advanced integration between an electronic checklist system on one hand, and an aircraft status information and/or aircraft control operation system on the other hand, that would reduce the user's workload became our goal—a goal that had not been satisfied by previous electronic checklist systems.

SUMMARY OF THE INVENTION

In view of the foregoing, it is an object of the present invention to overcome the drawbacks noted above and to provide an improved electronic checklist system and method for use in a vehicle (e.g., aircraft), preferably one that reduces the user's workload during checklist execution by providing advanced integration between the electronic checklist system and aircraft status information and/or aircraft control operation systems.

In view of the foregoing object, in one aspect, the present invention relates to an aircraft electronic checklist system comprising (a) aircraft electronic checklist display means for displaying on a display an aircraft checklist comprising one or more checklist line items; (b) hyperlink determining means for determining whether a checklist line item of the aircraft checklist has a hyperlink associated therewith; and (c) hyperlink indication display means for displaying on the display an indication as to whether a checklist line item of the aircraft checklist has a hyperlink associated therewith in accordance with a determination by said hyperlink determining means.

In another aspect, the present invention relates to an aircraft electronic checklist system comprising (a) an aircraft electronic checklist display that displays a plurality of aircraft checklist line items; and (b) a processor that (i) changes a display on said aircraft electronic checklist display when a user places a cursor on an aircraft checklist line item having a hyperlink displayed on said aircraft electronic checklist display without the user clicking thereupon, and (ii) when a checklist function associated with the hyperlink has been completed, automatically returns the cursor to said aircraft electronic checklist display which displays the plurality of aircraft checklist line items.

In yet another aspect, the present invention relates to an apparatus comprising (a) a display upon which is displayable an aircraft checklist comprising one or more checklist line items each representing a procedure to be performed; and (b) a processor that is configured to (i) determine whether a checklist line item of the aircraft checklist has a hyperlink associated therewith and (ii) display an indication as to whether a checklist line item of the aircraft checklist has a hyperlink associated therewith in accordance with the determination.

In still another aspect, the present invention relates to an aircraft electronic checklist system comprising (a) aircraft electronic checklist display means for displaying on a display an aircraft checklist comprising one or more checklist line items, at least one checklist line item having a hyperlink associated therewith; (b) hyperlinked information display means for displaying information linked by the hyperlink of a checklist line item in response to activation of the hyperlink.

In a still further aspect, the present invention relates to an apparatus comprising (a) a display upon which is displayable an aircraft checklist comprising one or more checklist line items each representing a procedure to be performed and at least one of which has a hyperlink associated therewith; and (b) a processor that is configured to display information linked by the hyperlink of a checklist line item in response to activation of the hyperlink.

In yet another aspect, the present invention relates to an apparatus comprising (a) aircraft electronic checklist display means for displaying on a display an aircraft checklist comprising one or more checklist line items, said aircraft checklist having a hyperlink associated therewith; and (b) hyperlinked information display means for displaying information linked by the hyperlink in response to activation of the hyperlink.

In yet a still further aspect, the present invention relates to an aircraft electronic checklist system comprising (a) aircraft electronic checklist display means for displaying on a display an aircraft checklist comprising one or more checklist line items; and (b) cursor repositioning means for automatically moving a cursor from the display to another display in response to the cursor being placed on a checklist line item of the aircraft checklist that has repositioning information associated therewith, without requiring input from a user to command repositioning.

In another aspect, the present invention relates to an aircraft electronic checklist system comprising (a) aircraft electronic checklist display means for displaying on a display an aircraft checklist comprising one or more checklist line items; and (b) cursor repositioning means for automatically moving a cursor from the display to another display in response to a user accessing a checklist line item of the aircraft checklist that has repositioning information associated therewith without requiring input from a user to command repositioning.

In a still further aspect, the present invention relates to an apparatus comprising (a) a display upon which is displayable an aircraft checklist comprising one or more checklist line items each representing a procedure to be performed; and (b) an automatic cursor repositioner that is configured to (i) automatically reposition a cursor from a checklist line item of the aircraft checklist to a window of the display other than a window in which the aircraft checklist is displayed, in accordance with selection of the checklist line item when the checklist line item has cursor repositioning information associated therewith, and (ii) in response to a user effecting control of the aircraft using the repositioned cursor, automatically returning the cursor to the window in which the aircraft checklist is displayed.

In another aspect, the present invention relates to a method comprising (a) displaying an aircraft checklist comprising one or more checklist line items; (b) determining whether a checklist line item of the aircraft checklist has a hyperlink; and (c) displaying an indication as to whether a checklist line item of the aircraft checklist has a hyperlink in accordance with a decision in said determining step.

In yet another aspect, the present invention relates to a method comprising (a) displaying on a display an aircraft checklist comprising one or more checklist line items; and (b) automatically moving a cursor from the display to another display in response to the cursor being placed on a checklist line item of the aircraft checklist that has cursor repositioning information associated therewith, without requiring input from a user to command movement of the cursor.

In a still further aspect, the present invention relates to a method comprising (a) displaying on a display an aircraft checklist comprising one or more checklist line items, at least one checklist line item representing an aircraft control procedure required to be carried out by a pilot; (b) displaying on a display a controllable graphical user interface element usable by the pilot to effect the aircraft control procedure of the checklist line item; and (c) moving a cursor from the checklist line item representing the aircraft control procedure to the controllable graphical user interface element without requiring the pilot to manually move the cursor using a cursor control device.

In further aspects, the present invention relates to computer code for executing the above-discussed methods and for use in implementing the above-discussed systems and apparatuses.

These and other objects, aspects, advantages and features of the present invention will become more apparent from the following detailed description of the presently preferred embodiments taken in conjunction with the accompanying drawings.

DESCRIPTION OF THE PRESENTLY PREFERRED EXEMPLARY EMBODIMENTS

1. Introduction

As discussed above, it was our goal to provide advanced integration between the electronic checklist system and the aircraft status information system and/or aircraft control operation system. We accomplished this goal by creating an electronic checklist system with hyperlinks. Hyperlinks are links from displayed information to information that may be desired to be displayed by a user, like those used on a web page on the internet. In our system, we linked checklist line items, or checklists themselves, to display of aircraft status information and/or prompts for aircraft control operations.

When a hyperlink is activated, the electronic checklist system causes display of information linked by the hyperlink, preferably in another window or an another display device. Additionally, the cursor can automatically move to the other window or display to assist the user in reviewing and/or acting upon the displayed information.

The present invention will now be described with reference to an exemplary embodiment including the use of software running on a computer. We will refer to the software that implements the electronic checklist system as the electronic checklist computer program. Of course, the invention could also be implemented in hardware if desired.

2. System Overview

Figure 1:
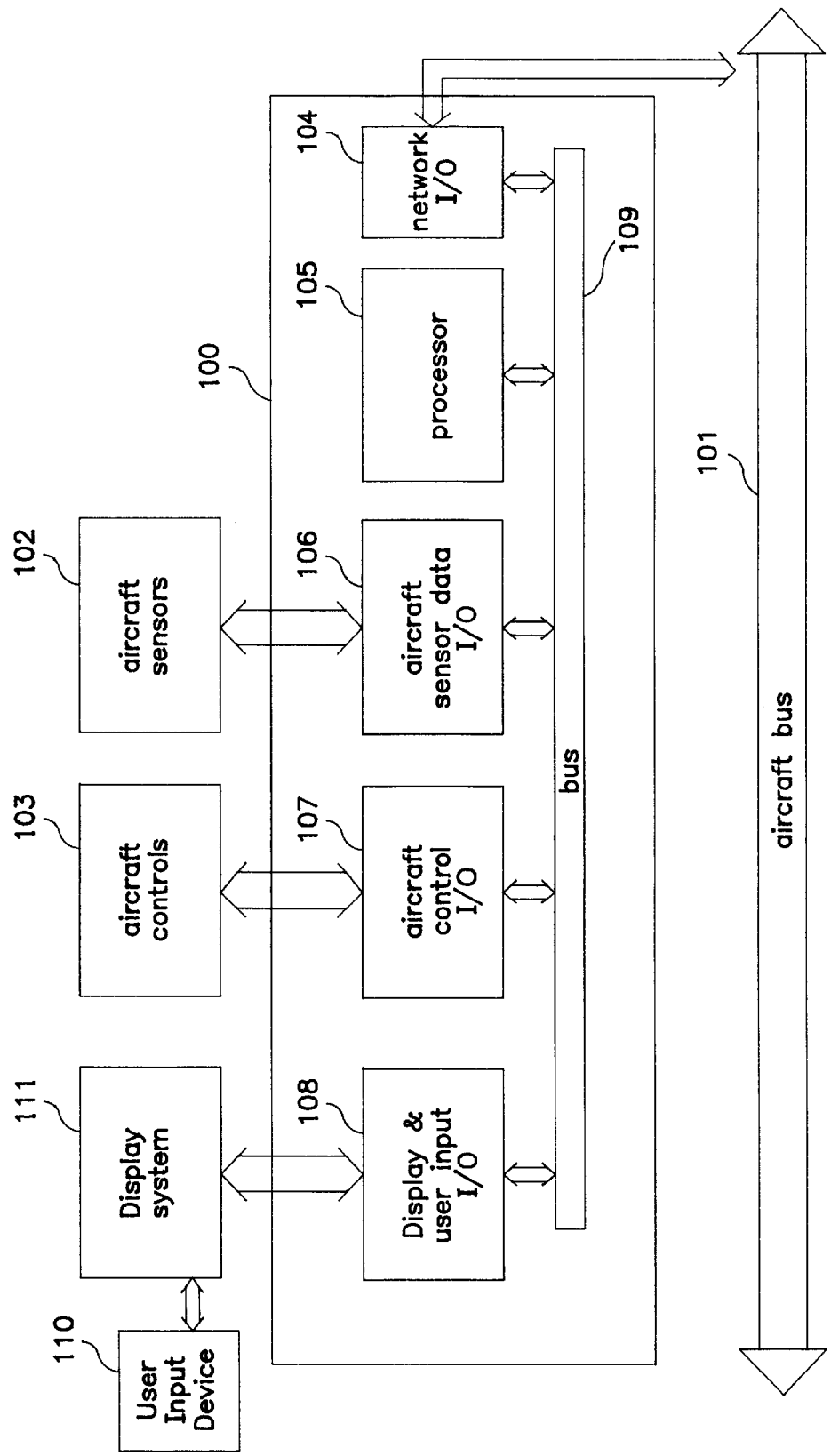
FIG. 1 is a schematic block diagram of an electronic checklist system in accordance with the present invention.

FIG. 1 is a schematic block diagram of the electronic checklist system. The system includes a computer system 100 which we call the modular avionics unit (MAU). Preferably the MAU 100 is located on board the aircraft. The MAU 100 includes a plurality of separate computers, preferably each having their own central processing unit (CPU), memory, and computer executable code (e.g., software). In a preferred embodiment, the computers include (a) a display and user input I/O computer 108, (b) an aircraft control I/O computer 107, (c) an aircraft sensor data I/O computer 106, and (d) a processor computer 105 that includes software for the electronic checklist. The computers communicate amongst one another using a bus 109 to which they are connected. The MAU 100 preferably also includes a network I/O 104 (e.g., a network interface card) that connects the MAU bus 109 to the aircraft bus 101, so that signals may be sent to and from the MAU 100 and other components of the aircraft network. Those components preferably include, for example, other various computers, which may include other MAU computers, display systems, and a modular radio cabinet, among others.

The aircraft sensor data I/O computer 106 receives signals from aircraft sensors 102. The aircraft sensors 102 detect aircraft status information. Examples include sensors that detect the cabin temperature, the cabin pressure, the fuel level, etc. Having received signals from the aircraft sensors 102, the aircraft sensor data I/O computer 106 converts the electrical signals into digital data (i.e., an aircraft bus format) and places the data on the MAU bus 109. Thus, the other computers on the MAU bus 109, such as the processor computer 105, can receive the digital data. Through the network interface card 104, the digital data is placed onto the aircraft bus 101. Through the aircraft bus 101, other components of the aircraft network can also receive the digital data. Of course, data can also flow in the reverse direction, so that data from other aircraft sensors located elsewhere on the aircraft network is transmitted through the aircraft bus 101 and the network interface card 104 to the MAU bus 109, where it can be received by, for example, the processor computer 105.

Aircraft controls 103 are connected to the aircraft control I/O computer 107. Preferably the aircraft control I/O computer 107 comprises two computers that communicate with one another, one of which we refer to as CIOCAL; however, for ease of discussion, we have schematically depicted aircraft control I/O computer 107 as a single unit and will refer to it as such. The aircraft controls 103 perform aircraft control operations. Examples of such controls include, e.g., motors, servos, actuators, and the like to, for example, move the flaps on the wings, lower the landing gear, circulate air through the cabin, and other well-known aircraft control operations. The aircraft control I/O computer 107 operates the aircraft controls 103 in response to, for example, commands received from the processor computer 105 via the MAU bus 109. Specifically, the aircraft control I/O computer 107 receives commands (in the form of digital data) and outputs electrical control signals to operate the aircraft controls 103. Of course, the processor computer 105 may also or alternatively send such commands via the network interface card 104 onto the aircraft bus 101 to operate other aircraft controls elsewhere on the aircraft network.

The processor computer 105 comprises a central processing unit (CPU) that executes software including the electronic checklist computer program and a memory that stores the software.

The display and user input I/O 108 connects the MAU 100 to a display system 111 that in turn is connected to a user input device 110. Alternatively, in an embodiment not illustrated the display system 111 and the user input device could be connected to the MAU 100 through the aircraft bus 101 via network interface card 104.

3. The Display and User Input Interface

Figure 2:
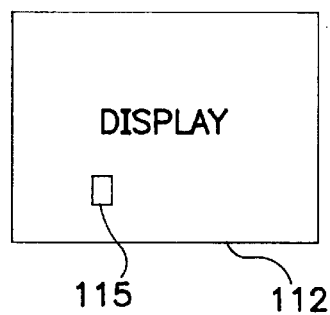
FIG. 2 is a schematic diagram of a display for use with the electronic checklist system.
Figure 3:
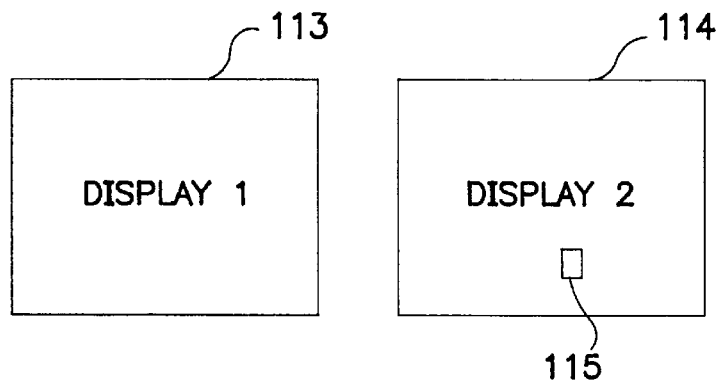
FIG. 3 is a schematic diagram of a two-display display system for use with the electronic checklist system.

As noted above, the display and user input I/O 108 receives the user's input from the user input device 110 (via the display system 111). Such a device may include a cursor control device (CCD). Examples of CCDs include a joystick, mouse, trackball, and rotary dial, among others. The display and user input I/O 108 also controls the display system 111. The display system 111 includes a display (e.g., CRT, LCD panel, etc. (also referred to as a display device)) 112, as shown in FIG. 2. It may include more than one display, e.g., first and second displays 113 and 114, as shown in FIG. 3. Or it may comprise first and second windows on a common display (see, e.g., FIG. 6, discussed below). When we talk about a computer program displaying information, such display preferably is effected through the display and user input I/O 108 and display 112 (or displays 113 and 114), for example.

Using the CCD, the user can move the cursor 115 around a display. Using an "enter" button or the like on the CCD (e.g., by clicking on a mouse button where the CCD is a mouse), the user may input a selection. In the preferred embodiment, each user has a single cursor. Where there is more than one display, the user may move that cursor from display to display using the CCD (which may, for example, have display select buttons that cause the cursor to move from display to display).

4. The Processor

Figure 4:
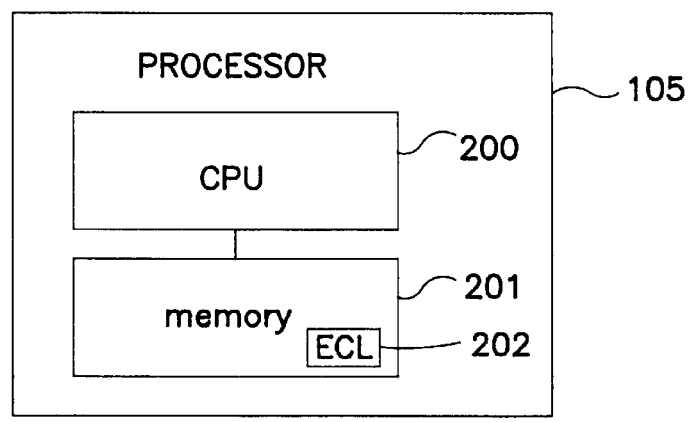
FIG. 4 is a schematic block diagram of the processor of a computer used to implement the electronic checklist system.

FIG. 4 depicts the processor computer 105 of the MAU 100. As can be seen, the processor computer 105 includes a CPU 200 (e.g., a microprocessor) that executes computer programs and a memory 201 (e.g., RAM) for storing computer programs. Reference numeral 202 depicts the electronic checklist computer program, which is stored in the memory 201 (as computer executable code) for execution by the CPU 200. Of course, RAM is but one example of a computer readable medium upon which the electronic checklist computer program could be stored.

5. The Electronic Checklist Computer Program

Now we will describe the electronic checklist computer program. By way of overview, the computer program displays a checklist on a display, the checklist comprising one or more checklist line items. A checklist line item may have a hyperlink associated therewith. If it does, then the computer system preferably displays an indication such as an icon to alert the user. If a hyperlink is activated, then the information linked by the hyperlink (also referred to as hyperlinked information) is displayed. That information preferably is displayed on another window of the display containing the checklist (i.e., a window other than the window containing the checklist). Alternatively, the information may be displayed on another display device. Activation of a hyperlink may be either manual (i.e., in response to manual input by a user (e.g., the user clicking on a checklist line item or a hyperlink indication)) or automatic (i.e., without requiring input from the user to command the display (e.g., when a cursor is placed on a checklist line item or when the user accesses a checklist line item)). The latter configuration is called "automatic popup".

Figure 5:
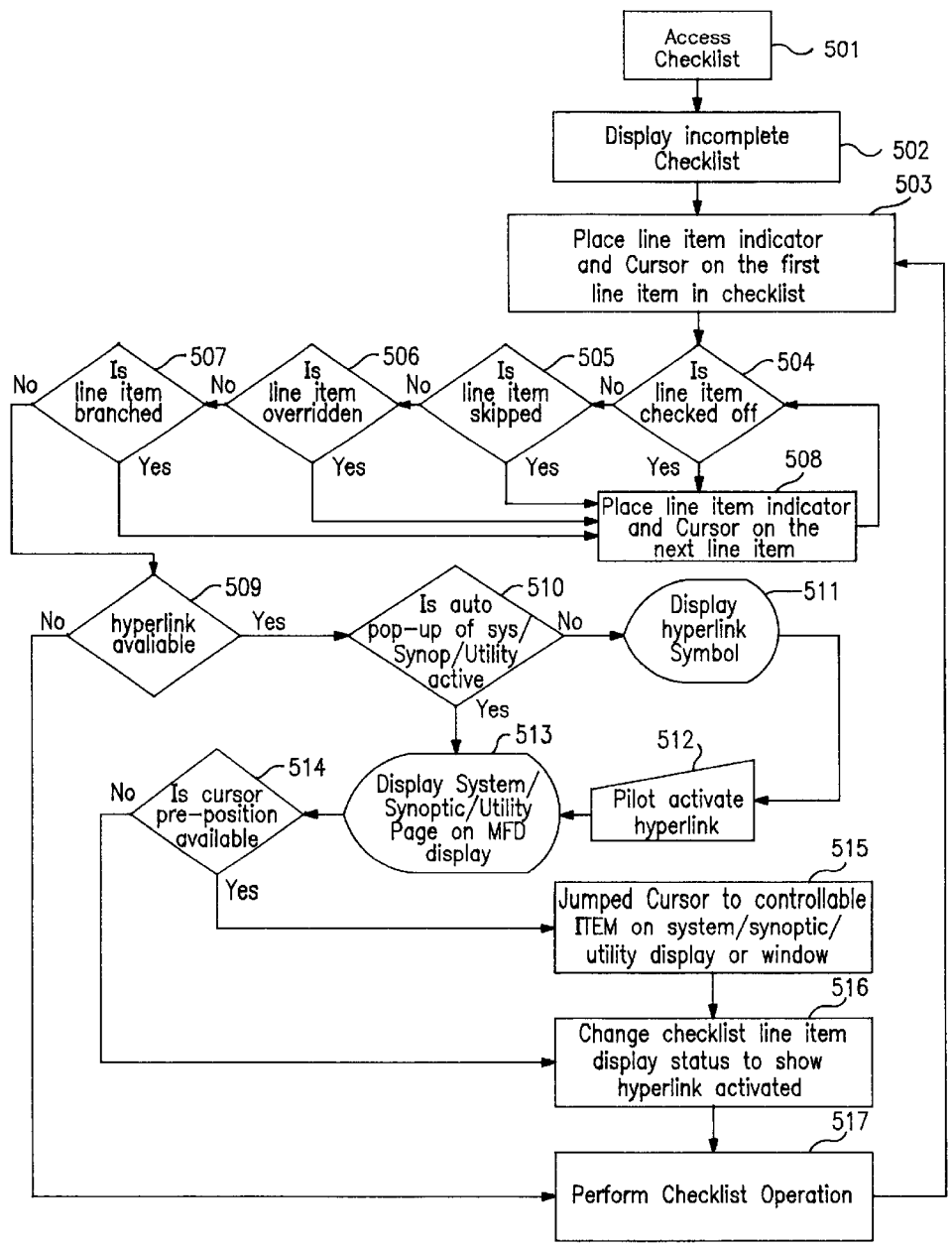
FIG. 5 is a flowchart showing steps executed by the computer code of a computer program used to effect the electronic checklist system.

FIG. 5 is a flowchart that depicts the foregoing procedure of the computer program in more detail. First, the computer program accesses the checklist (step 501). Since the checklist is incomplete (i.e., not all checklist line items have been checked off), the checklist is displayed (i.e., all of the checklist line items are listed on the display) (step 502). Next, a line item indicator and a cursor are placed on the first checklist line item (step 503). If the checklist line item has been checked off (step 504), or the checklist line item has been skipped (step 505), or the checklist item has been overridden (step 506), or the checklist item is branched (step 507), then the line item indicator and cursor are moved to the next line item (step 508). (We will briefly describe branched checklist line items. Specifically, during the execution of a complex checklist procedure, the pilot must determine the condition of the airplane partway through the checklist. The pilot answer will determine which branch of the checklist the pilot will follow to complete the checklist. Using the CCD, the pilot will provide input by selecting a YES or NO prompt displayed in the branched (conditional) line item. Upon pilot input, the procedure text that no longer applies to the current airplane condition is de-emphasized (grayed out), and the line item indicator will move to the selected branch of the checklist procedure text. For example, during flight if "Fuel pressure Low" is detected, the checklist requires the pilot to perform a set of procedures to remove the fault. This set of procedures requires the pilot to describe the aircraft condition so that the ECL (electronic checklist) will display the related procedure, which will help pilot resolve the problem. For the Fuel Pressure low condition, the checklist procedure will require the pilot to shut off the effective fuel valve. Then it will ask the pilot to verify if the abnormal condition still exists. Based on pilot response the checklist will decide to finish the checklist or display other necessary procedures to assist the pilot in safe flight operations.)

Otherwise, the line item indicator and cursor will have come to rest upon the first incomplete checklist line item. The line item indicator will remain there until the checklist line item is complete, but the user can move the cursor around the display as he or she sees fit.

At this point, a check is made as to whether the checklist line item has a hyperlink available, i.e., as to whether the checklist line item has a hyperlink associated therewith (step 509). If no hyperlink is available, then the program awaits checking off of the checklist item (step 517).

If a hyperlink is available, then the program determines whether or not automatic popup is active (step 510). If yes, then the program causes automatic display of the hyperlinked information (step 513), i.e., the hyperlink is automatically activated (without the necessity of user input). In other words, in response to the cursor being moved to the checklist line item, the hyperlinked information is automatically displayed. (Alternatively, the hyperlinked information may be automatically displayed when the user or computer program accesses the checklist line item, whether or not a cursor is moved.)

Figure 6:
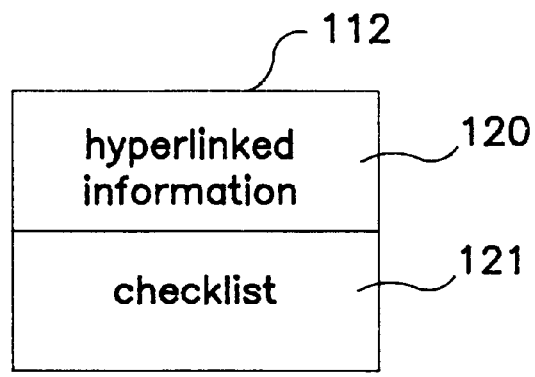
FIG. 6 is an explanatory diagram showing display of a checklist and hyperlinked information on a display of the electronic checklist system.
Figure 7:
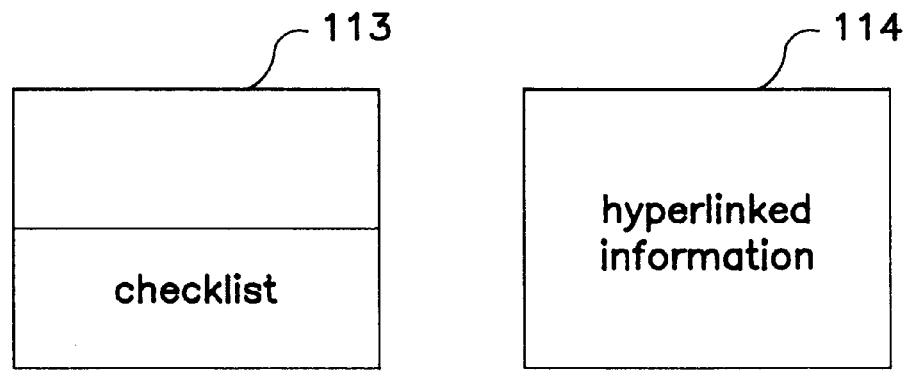
FIG. 7 is an explanatory diagram showing display of a checklist and hyperlinked information in a two-display system of the electronic checklist system.

As explained above, the hyperlinked information may be displayed on the same display as the checklist. FIG. 6 schematically depicts this situation. In that figure, display 112 includes two windows 120 and 121 respectively containing the hyperlinked information and the checklist, by way of example. Alternatively, the hyperlinked information may be displayed on a different display device from that upon which the checklist is displayed. FIG. 7 schematically depicts this situation. In that figure, display 113 displays the checklist while display 114 displays the hyperlinked information.

If automatic popup is not active, then the program displays a hyperlink indication on the display (step 511). Preferably, the hyperlink indication is an icon or symbol (e.g., the leftward facing arrow shown in step 511). This alerts the user that a checklist line item has a hyperlink available. The program defers display of the hyperlinked information until the user activates the hyperlink (step 512). There are a variety of ways in which the user can activate a hyperlink. For example, the user can move the cursor to the hyperlink indication, or select (e.g., click on) the hyperlink indication, or select (e.g., click on) the checklist line item, or press a dedicated hyperlink key positioned at the display.

The hyperlinked information preferably comprises aircraft status information. To display aircraft status information, the program obtains the same from aircraft sensor data I/O 106 which in turn receives signals from the aircraft sensors 102, as discussed above. This provides a great advantage to the user. In the past, aircraft status information could be displayed on a display in the cockpit. But the pilot had to manually instruct the system to display screens containing the aircraft status information that the checklist line item required the pilot to review. For example, aircraft status information regarding the fuel system, the status of valves or pumps, the fuel tank, and the like (all included in a so-called "fuel system/synoptic page") was displayable on a display. However, during execution of a fuel unbalance checklist, the pilot had to manually select the fuel system/synoptic page for display on a multifunction display (MFD (see below)) to perform a required checklist operation. In contrast, our system not only displays such information on a display, but links that information to a checklist line item using a hyperlink. Thus, where the checklist line item requires that the user verify aircraft status information, that information is readily accessible, reducing the user's workload. Consider the following example. Suppose that a user is proceeding through a checklist on a display. Suppose further that a checklist line item requires that the user check the cabin temperature. If there were no hyperlink, then the user would have to instruct the system to display a new screen or window containing that aircraft status information, i.e., the cabin temperature, if such were not already displayed. This manual operation increases the user's workload. In contrast, in our system, the cabin temperature information can be hyperlinked to the corresponding checklist line item. If automatic popup is set, then the information is automatically displayed—without requiring input from the user to command the display or to instruct the system to display a new screen or a new window—merely upon the cursor being moved to the checklist line item or the user accessing the checklist line item. This greatly reduces the user's workload. Even if automatic popup is not set, then the user may follow the hyperlink to the hyperlinked information easily by activating the hyperlink, e.g., by clicking on the hyperlink indication.

In addition to or as an alternative to aircraft status information, the hyperlinked information may comprise an aircraft control operation prompt. An aircraft control operation prompt is a prompt displayed on a display that requests input from the user to control an operation of the aircraft (in response to the user input, the system effects the aircraft control operation). In the past, aircraft control operations (e.g., lowering the landing gear, closing a valve, turning on the cabin lights, etc.) were effected by actuation of dedicated switches, dials, buttons, and the like, mounted on the cockpit dashboard. In contrast, in our system, such operations may be provided on a display and the user can perform such operations by providing input to a prompt using the CCD or the like. When the user provides the input, the processor computer 105 (preferably by using a utility control computer program stored therein) interprets the user input and sends a signal to the aircraft control I/O computer 107 through the MAU bus 109. The aircraft control I/O computer 107 in response to the signal sends another signal to the aircraft controls 103, which in turn perform the aircraft control operation specified by the user. For example, the user might click on a button displayed on the screen, causing a signal to be sent to the motor that moves the flaps, or to a servo that shuts a valve, etc.

We prefer to use a graphical user interface (GUI) to provide the aircraft control operation prompt. We call the GUI elements used to provide the prompt "controllable items" because they are GUI elements that are controlled by the user so as to provide the user's input to the system. Examples include buttons (referred to as GUI buttons or soft buttons), Other examples include sliding or scrolling indicators used to set values (e.g., an indicator used to set altitude), typically operated by the CCD (e.g., by turning a rotary dial). We refer to screens containing aircraft status information or controllable items for aircraft control operations as "synoptic", "system", or "utility" pages or screens (or windows if they are so displayed). We generically refer to such screens as "system/synoptic/utility" pages, and since the displays that display such screens are typically used for multiple purposes we call such displays "multifunction displays" (MFDs). The above-discussed step 513 uses the above-described terms.

Using the foregoing construction, our electronic system provides a great advantage over previous systems. Consider, for example, a situation where a checklist line item requires that the user perform an aircraft control operation—setting the cabin temperature. Without requiring the user to manually instruct the system to display a new screen or new window (e.g., Environmental Control System display) containing a controllable item that when actuated will adjust the cabin temperature, the system may automatically activate a hyperlink (or the user may simply manually activate a hyperlink) to display a system display format (i.e., a system page) with the controllable item.

Returning to the flowchart of FIG. 5, the remaining steps show another exceptional feature of our electronic checklist system: cursor positioning. As discussed above, preferably the aircraft control operation prompt (e.g., controllable item) is displayed on a window or display different from that of the checklist. The user can manually move the cursor using the CCD from the window or display containing the checklist to the window or display containing the aircraft control operation prompt so that the user may make input to the prompt. To eliminate this step, we have developed automatic cursor positioning. Therein, the computer program can automatically move, jump, or reposition the cursor from the displayed checklist to the aircraft control operation prompt, so as to reduce the user's workload in locating and moving the cursor to the item. Thus, in step 514, the computer program determines whether or not cursor pre-positioning information is available for (i.e., associated with) a checklist line item. If so, then the computer program moves the cursor from the checklist to the aircraft control operation prompt (e.g., the controllable item), which preferably is located in a window other than or a display other than that used to display the checklist (step 515). Such automatic movement of the cursor to the controllable item relieves the user of the burden of manually instructing or commanding the system to reposition the cursor, e.g., by using the cursor control device. This greatly reduces the workload of the user.

Next, or if cursor-prepositioning/repositioning were not available, the computer program changes the display status of the checklist line item to show the user that the hyperlink has been activated (step 516). Preferably, the hyperlink indication changes from a hollow icon to a filled-in icon on the display or the checklist line item is displayed in inverse video, providing the pilot the visual cue that the hyperlink is active and that the cursor is on the system page.

Next, or if no hyperlink had been available, the computer program performs checklist operation as normal, e.g., awaits checking off of the checklist line item (step 517). In that step, if a controllable item has been displayed by activation of a hyperlink, then when the user actuates the controllable item, the electronic checklist system preferably automatically checks off the checklist item without requiring further input from the user (i.e., closed loop style), although the system may be configured to require manual checkoff if desired (i.e., open loop style).

Finally, following step 517, the computer program returns to step 503 to continue processing of the checklist.

6. Exemplary Operation

To further assist the reader in perceiving the advantages of the present invention, we will now set forth an example of its operation in even more detail. FIGS. 8A through 8E each show examples of first and second displays (113 and 114) of the system in respective states of operation.

Figure 8A:
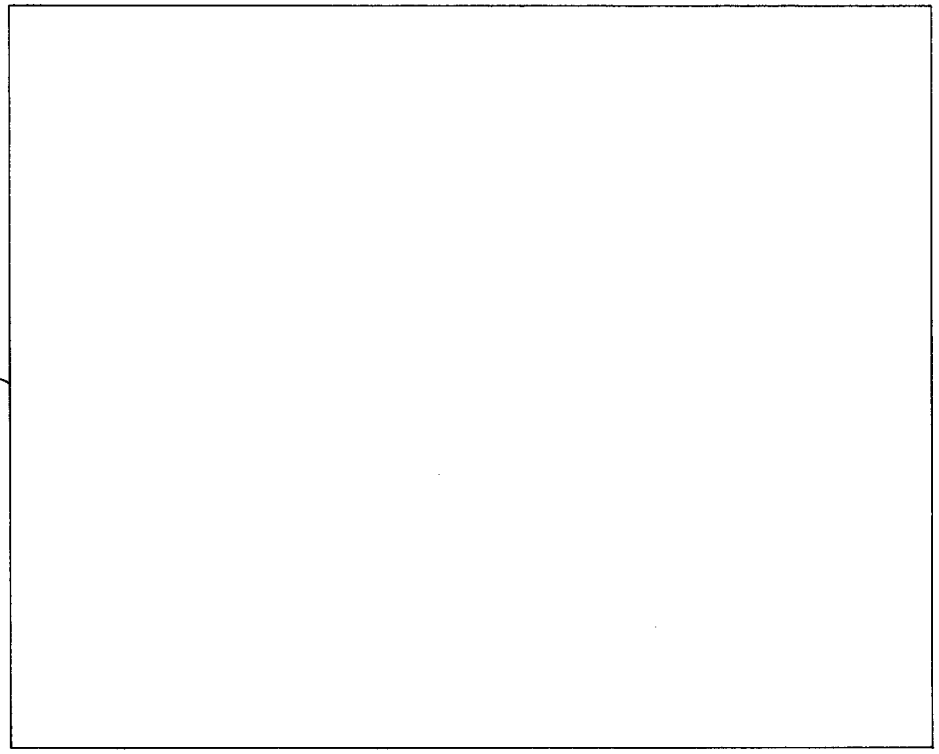
FIGS. 8A through 8F are explanatory diagrams each showing displays of a checklist and hyperlinked information on displays or a display of the electronic checklist system.
Figure 8A:
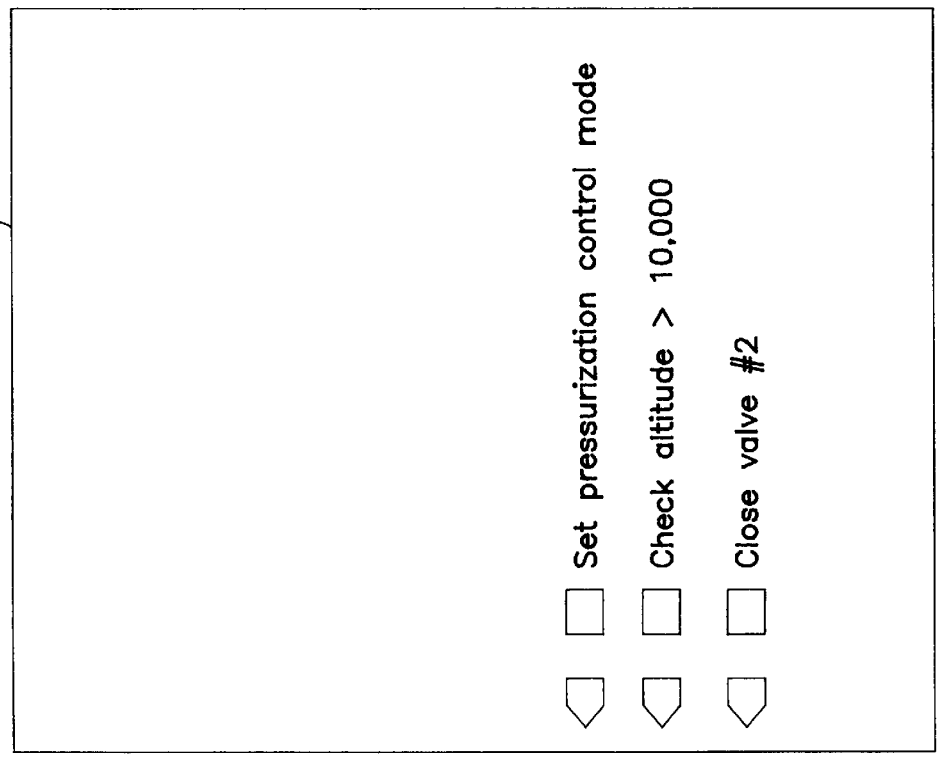
Figure 8B:
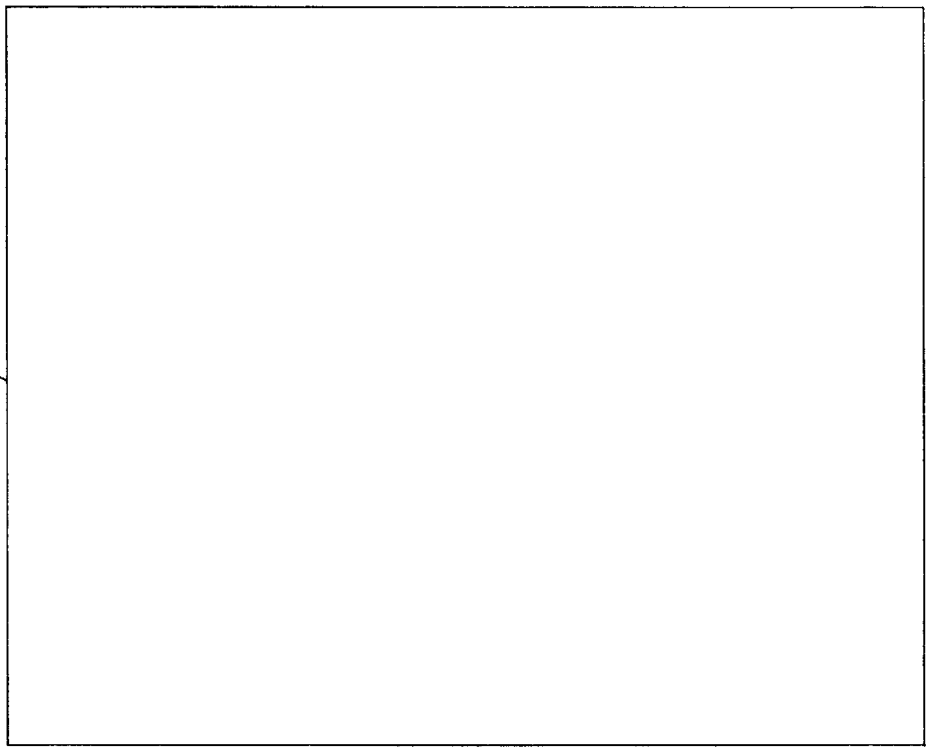
Figure 8B:
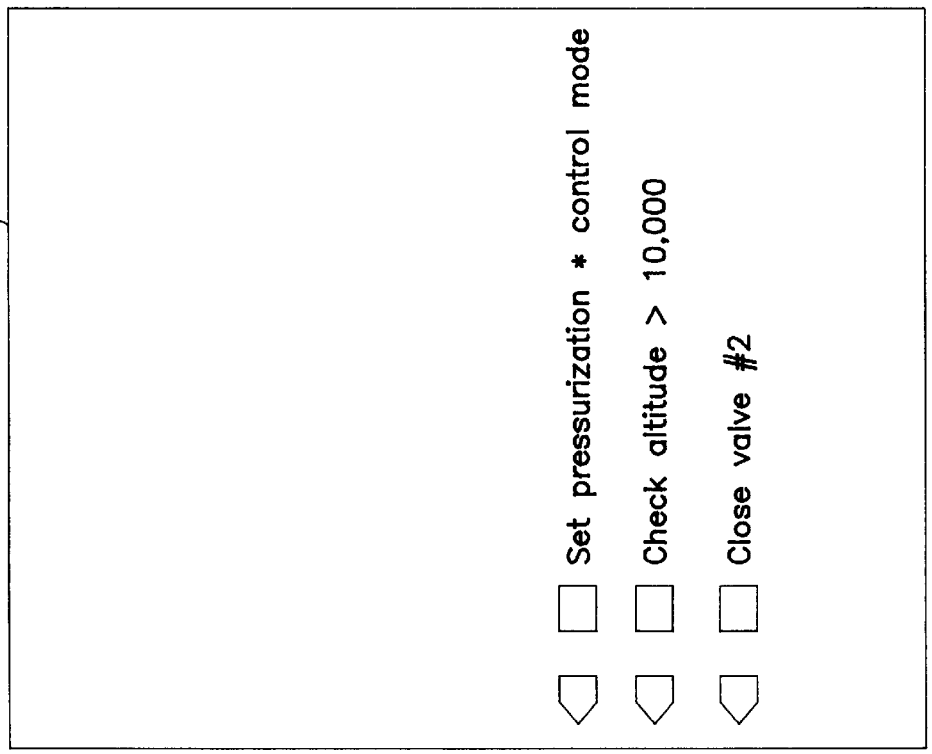

In FIG. 8A, three checklist line items are displayed on the first display, (1) set pressurization control mode, (2) check altitude>10,000, and (3) close valve. Each has a hyperlink indicator in the form of a leftward directed arrow icon positioned in the left margin. In FIG. 8B, the cursor, represented by "*", has been placed on the first checklist line item. As in FIG. 8A, nothing is yet displayed on the second display. Assume that the first checklist line item has a hyperlink associated therewith as well as automatic cursor positioning.

Figure 8C:
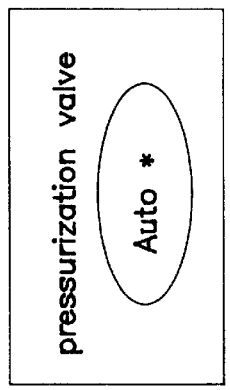

Now in FIG. 8C, in response to movement of the cursor to and positioning on the first checklist line item, an aircraft control operation prompt corresponding to an aircraft control operation required by the first checklist line item is displayed on the second display. The prompt is a controllable item, specifically a GUI button for toggling the pressurization valve back and forth between AUTO and MANUAL. The prompt also includes aircraft status information, namely the status of the valve as determined by the aircraft sensors, in this case AUTO. And the cursor has been automatically positioned on the controllable item without requiring the user to instruct the repositioning using the CCD. Lastly, the hyperlink indication for the first checklist line item has been filled in to show its activation. FIG. 8F shows how the display of FIG. 8C could alternatively be displayed using two windows of a single display, rather than two separate displays—therein, the controllable item and cursor is in the top window and the checklist is in the bottom window.

Figure 8D:
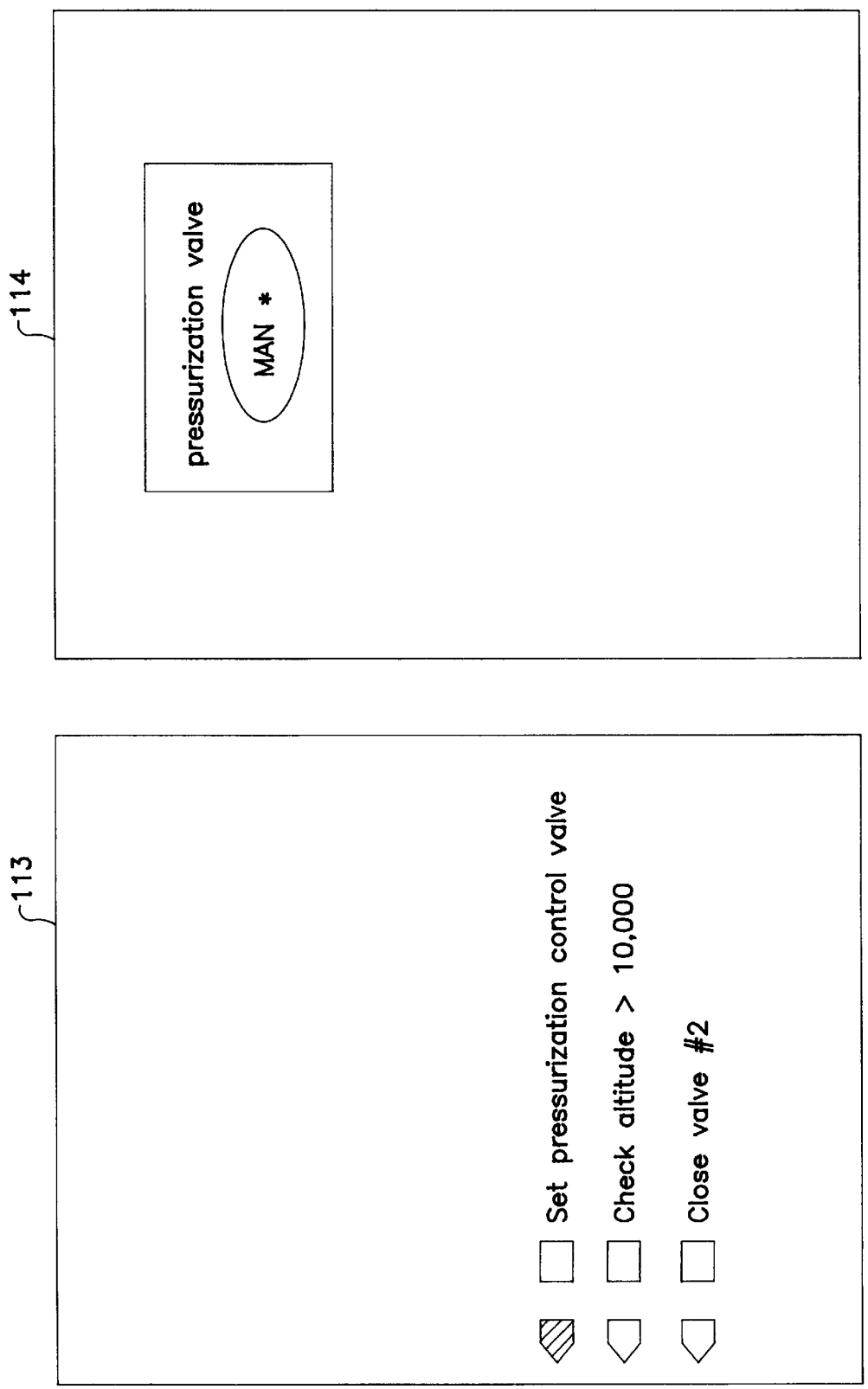
Figure 8E:
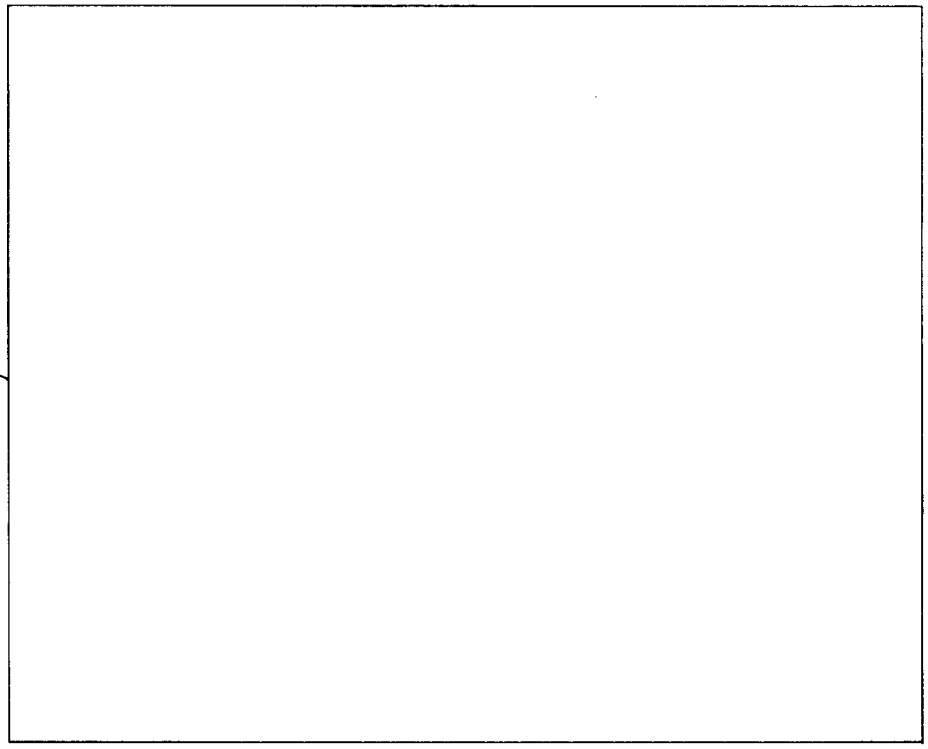
Figure 8E:
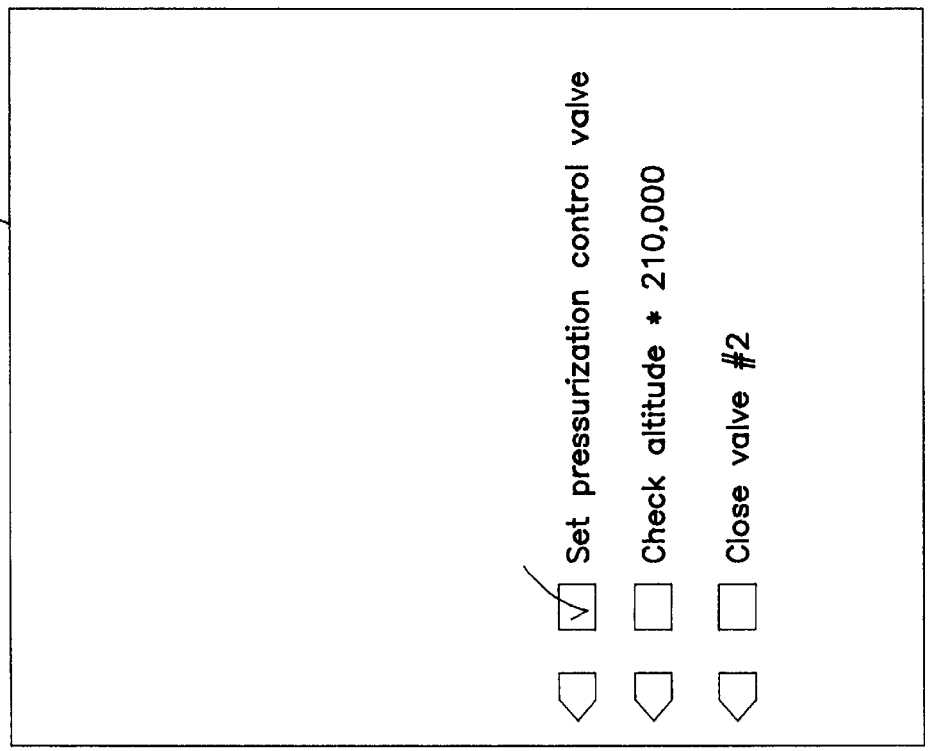
Figure 8F:
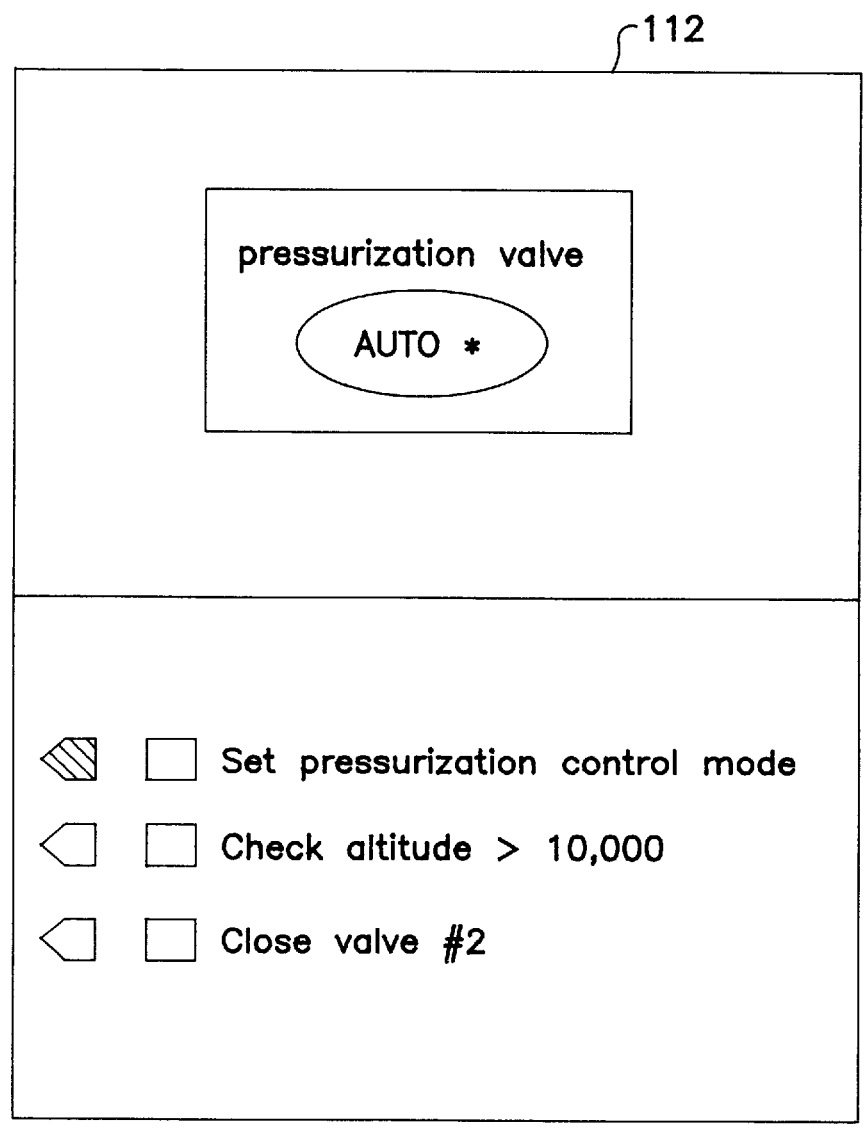

In FIG. 8D, in response to the user pressing the enter button on the CCD, the controllable item is toggled from AUTO to MANUAL with a signal being sent through the aircraft control I/O to drive the valve in question of the aircraft controls 103. The computer program then checks off the checklist line item automatically (in this example, the checklist line item is set up as a closed loop item), and returns the cursor to the first display, and specifically to the next checklist line item, namely the second checklist line item, as shown in FIG. 8E.

7. Alternate Embodiments

Although the electronic checklist system has been described above as having hyperlinks associated with a checklist line item, it is not so limited and the hyperlink may be associated with a checklist itself. Furthermore, although the electronic checklist system has been described as having aircraft status information and/or aircraft control operation prompts as the hyperlinked information, the hyperlinked information is not so limited and may comprise other information of interest. In fact the electronic checklist system is not limited to aircraft but may be used for other types of vehicles or for other situations where checklists are used. Furthermore, the methods of activating the hyperlinks and/or cursor positioning are given by way of example and not of limitation, and those features may be used either together or separately as seen fit.

Furthermore, although the electronic checklist system has been described above as sending and receiving data using an aircraft bus 101 (and MAU bus 109), it is not so limited and can get the required data from any other source. Still further, the user interface (i.e., display device/system and user input device) of the electronic checklist system may be coupled to the electronic checklist system through the aircraft bus 101 (instead of being directly connected), or through any well known technique.

In addition, while the electronic checklist system has been described above as having a plurality of separate computers each having their own processor, memory, and the like, the system is not so limited, and it may be implemented using a single computer or other hardware or software, as desired.

8. Conclusion

Except as otherwise disclosed herein, the various components shown in outline or in block form in the figures are individually well known and their internal construction and operation are not critical either to the making or using of this invention or to a description of the best mode of the invention.

Although specific embodiments of the present invention have been described above in detail, it will be understood that this description is merely for purposes of illustration. Various modifications of and equivalent structures corresponding to the disclosed aspects of the preferred embodiments in addition to those described above may be made by those skilled in the art without departing from the spirit of the present invention which is defined in the following claims, the scope of which is to be accorded the broadest interpretation so as to encompass such modifications and equivalent structures.

What is claimed is:

1. An aircraft electronic checklist system comprising:
   aircraft electronic checklist display means for displaying on a display an aircraft checklist comprising one or more checklist line items that define a procedure used to verify air aircraft status;
   hyperlink determining means for determining whether a checklist line item of the aircraft checklist has a hyperlink associated therewith; and
   hyperlink indication display means for displaying on the display an indication as to whether a checklist line item of the aircraft checklist has a hyperlink associated therewith in accordance with a determination by said hyperlink determining means.

2. An aircraft electronic checklist system according to claim 1, further comprising hyperlinked information display means for displaying, on another display, information linked by the hyperlink of a checklist line item having a hyperlink associated therewith.

3. An aircraft electronic checklist system according to claim 2, wherein said hyperlinked information display means automatically displays, on the another display, the information linked by the hyperlink in response to a cursor being placed on the checklist line item without requiring further input from a user.

4. An aircraft electronic checklist system according to claim 2, wherein said hyperlinked information display means automatically displays, on the another display, the information linked by the hyperlink in response to a user accessing the checklist line item without requiring further input from the user.

5. An aircraft electronic checklist system according to claim 2, wherein said hyperlinked information display means displays, on the another display, information linked by the hyperlink in response to a user selecting the hyperlink indication of a checklist line item having a hyperlink associated therewith.

6. An aircraft electronic checklist system according to claim 2, wherein the information linked by the hyperlink comprises aircraft status information.

7. An aircraft electronic checklist system according to claim 2, wherein the information linked by the hyperlink comprises a request for input by a user.

8. An aircraft electronic checklist system according to claim 2, wherein the information linked by the hyperlink comprises a controllable graphical user interface item used to input information from a user to control an operation of the aircraft.

9. An aircraft electronic checklist system according to claim 8, wherein the controllable graphical user interface item comprises a soft button.

10. An aircraft electronic checklist system according to claim 8, further comprising cursor repositioning means for automatically repositioning a cursor from the display containing the hyperlink indication to the information linked by the hyperlink on the another display without requiring input from a user to command repositioning.

11. An aircraft electronic checklist system according to claim 2, further comprising cursor repositioning means for automatically repositioning a cursor from the display containing the hyperlink indication to the information linked by the hyperlink on the another display without requiring input from a user to command repositioning.

12. An aircraft electronic checklist system according to claim 1, wherein the hyperlink indication comprises an icon.

13. An aircraft electronic checklist system according to claim 1, further comprising hyperlinked information display means for displaying, on a window of the display other than a window in which the aircraft checklist is displayed, information linked by the hyperlink of a checklist line item having a hyperlink associated therewith.

14. An aircraft electronic checklist system according to claim 13, wherein said hyperlinked information display means automatically displays the information linked by the hyperlink in response to a cursor being placed on the checklist line item without requiring further input from a user.

15. An aircraft electronic checklist system according to claim 13, wherein said hyperlinked information display means automatically displays the information linked by the hyperlink in response to a user accessing the checklist line item without requiring further input from the user.

16. An aircraft electronic checklist system according to claim 13, wherein said hyperlinked information display means displays information linked by the hyperlink in response to a user selecting the hyperlink indication of a checklist line item having a hyperlink associated therewith.

17. An aircraft electronic checklist system according to claim 13, wherein the information linked by the hyperlink comprises aircraft status information received from sensors of the aircraft.

18. An aircraft electronic checklist system according to claim 13, wherein the information linked by the hyperlink comprises a prompt requesting input from a user, which input is used to effect an aircraft control operation.

19. An aircraft electronic checklist system according to claim 18, wherein the prompt is a graphical user interface element that is controllable by the user using a cursor control device.

20. An aircraft electronic checklist system according to claim 13, further comprising cursor repositioning means for automatically repositioning a cursor from the checklist to the information linked by the hyperlink without the user commanding repositioning using a cursor control device.

21. An aircraft electronic checklist system according to claim 1, further comprising hyperlinked information display means for displaying on a display information linked by the hyperlink of a checklist line item having a hyperlink associated therewith in response to a user pressing a button other than a button of a cursor control device.

22. An aircraft electronic checklist system comprising:
an aircraft electronic checklist display that displays a plurality of aircraft checklist line items that define a procedure used to verify aircraft status; and
a processor that (i) changes a display on said aircraft electronic checklist display when a user places a cursor on an aircraft checklist line item having a hyperlink displayed on said aircraft electronic checklist display without the user clicking thereupon, and (ii) when a checklist function associated with the hyperlink has been completed, automatically returns the cursor to said aircraft electronic checklist display which displays the plurality of aircraft checklist line items.

23. An apparatus comprising:
a display upon which is displayable an aircraft checklist comprising one or more check list line items each representing a procedure to be performed that define a procedure used to verify aircraft status; and
a processor that is configured to (a) determine whether a checklist line item of the aircraft checklist has a hyperlink associated therewith and (b) display an indication as to whether a checklist line item of the aircraft checklist has a hyperlink associated therewith in accordance with the determination.

24. An apparatus according to claim 23, wherein information linked by the hyperlink is displayed on another window on the same display as the aircraft checklist.

25. An apparatus according to claim 23, wherein the aircraft checklist is displayed on a first display, and information linked by the hyperlink is displayed on a second display.

26. An apparatus according to claim 23, wherein information linked by the hyperlink is information regarding status of the aircraft, or a prompt used by a user to control operation of the aircraft.

27. An aircraft electronic checklist system comprising:
aircraft electronic checklist display means for displaying on a display an aircraft checklist comprising one or more checklist line items that define a procedure used to verify aircraft status, at least one checklist line item having a hyperlink associated therewith; and
hyperlinked information display means for displaying information linked by the hyperlink of a checklist line item in response to activation of the hyperlink.

28. An aircraft electronic checklist system according to claim 27, wherein placing of a cursor on a checklist line item having a hyperlink causes activation of the hyperlink.

29. An aircraft electronic checklist system according to claim 27, wherein accessing of a checklist line item having a hyperlink causes activation of the hyperlink.

30. An apparatus comprising:
a display upon which is displayable an aircraft checklist comprising one or more checklist line items each representing a procedure to be performed that define a procedure used to verify aircraft status and at least one of which has a hyperlink associated therewith; and
a processor that is configured to display information linked by the hyperlink of a checklist line item in response to activation of the hyperlink.

31. An apparatus comprising:
aircraft electronic checklist display means for displaying on a display an aircraft checklist comprising one or more checklist line items that define a procedure used to verify aircraft status, said aircraft checklist having a hyperlink associated therewith; and
hyperlinked information display means for displaying information linked by the hyperlink in response to activation of the hyperlink.

32. An apparatus according to claim 31, wherein the aircraft checklist comprises a plurality of checklist line items,
wherein accessing of the aircraft checklist by the user causes activation of the hyperlink,
wherein said hyperlinked information display means displays the information linked by the hyperlink in a window of the display other than a window in which the aircraft checklist is displayed,
wherein the information linked by the hyperlink comprises at least one of (a) aircraft status information received from sensors to the aircraft, which information is required by a checklist line item to be monitored, and (b) an aircraft control operation prompt for requesting input from a user to control an operation of the aircraft, which operation is required by a checklist line item to be performed, and
wherein when the information linked by the hyperlink comprises the aircraft control operation prompt, said apparatus automatically moves a cursor to the aircraft control operation prompt without requiring the user to reposition the cursor using a cursor control device.

33. An aircraft electronic checklist system comprising:
aircraft electronic checklist display means for displaying on a display an aircraft checklist comprising one or more checklist line items that define a procedure used to verify aircraft status; and
cursor repositioning means for automatically moving a cursor from the display to another display in response to the cursor being placed on a checklist line item of the aircraft checklist that has repositioning information associated therewith, without requiring input from a user to command repositioning.

34. An aircraft electronic checklist system according to claim 33, wherein said cursor repositioning means automatically moves the cursor to information on the another display requesting user input.

35. An aircraft electronic checklist system according to claim 33, wherein said cursor repositioning means automatically moves the cursor to a graphical user interface input prompt on the another display.

36. An aircraft electric checklist system according to claim 35, wherein the graphical user interface input prompt, when operated upon by a user, controls an operation of the aircraft.

37. An aircraft electronic checklist system according to claim 33, wherein said cursor repositioning means automatically moves the cursor to information on the another display that is hyperlinked to the checklist line item.

38. An aircraft electronic checklist system comprising:
aircraft electronic checklist display means for displaying on a display an aircraft checklist comprising one or more checklist line items that define a procedure used to verify aircraft status; and
cursor repositioning means for automatically moving a cursor from the display to another display in response to a user accessing a checklist line item of the aircraft checklist that has repositioning information associated therewith without requiring input from a user to command repositioning.

39. An apparatus comprising:
a display upon which is displayable an aircraft checklist comprising one or more checklist line items each representing a procedure to be performed that defirm a procedure used to verify aircraft status; and
an automatic cursor repositioner that is configured to (i) automatically reposition a cursor from a checklist line item of the aircraft checklist to a window of the display other than a window in which the aircraft checklist is displayed, in accordance with selection of the checklist line item when the checklist line item has cursor repositioning information associated therewith, and (ii) in response to a user effecting control of the aircraft using the repositioned cursor, automatically returning the cursor to the window in which the aircraft checklist is displayed.

40. An apparatus according to claim 39, wherein said apparatus is configured to automatically check off the checklist line item upon the automatic return of the cursor.

41. A method comprising:
displaying an aircraft checklist comprising one or more checklist line items that define a procedure used to verify aircraft status;
determining whether a checklist line item of the aircraft checklist has a hyperlink; and
displaying an indication as to whether a checklist line item of the aircraft checklist has a hyperlink in accordance with a decision in said determining step.

42. A method comprising:
displaying on a display an aircraft checklist comprising one or more checklist line items that define a procedure used to verify aircraft statue; and
automatically moving a cursor from the display to another display in response to the cursor being placed on a checklist line item of the aircraft checklist that has cursor repositioning information associated therewith, without requiring input from a user to command movement of the cursor.

43. A method comprising:
displaying on a display an aircraft checklist comprising one or more checklist line items that define a procedure used to verify aircraft status, at least one checklist line item representing an aircraft control procedure required to be carried out by a pilot;
displaying on a display a controllable graphical user interface element usable by the pilot to effect the aircraft control procedure of the checklist line item; and
moving a cursor from the checklist line item representing the aircraft control procedure to the controllable graphical user interface element without requiring the pilot to manually move the cursor using a cursor control device.

44. A method according to claim 43, wherein the aircraft checklist and controllable graphical user interface element are on the same display.

45. A method according to claim 43, wherein the aircraft checklist and controllable graphical user interface element are on different displays.

46. A method according to claim 43, further comprising:
automatically checking off the checklist line item in response to the pilot controlling the controllable graphical user interface element to effect the aircraft control procedure of the checklist line item, without requiring the pilot to manually instruct the checking off.

47. A method according to claim 43, further comprising:
automatically moving the cursor from the controllable graphical user interface element to the aircraft checklist in response to the pilot controlling the controllable graphical user interface element to effect the aircraft control procedure of the checklist line item without automatic check off of the checklist line item.

48. Computer code for effecting the method of claim 41.
49. Computer code for effecting the method of claim 42.

* * * * *